(12) United States Patent
Kenny et al.

(10) Patent No.: US 6,371,437 B1
(45) Date of Patent: Apr. 16, 2002

(54) THERMALLY OPERATED VALVE FOR AUTOMATICALLY MODULATING THE FLOW OF FLUIDS AND METHODS AND TOOL FOR MAKING THE SAME

(75) Inventors: Thomas M. Kenny, 693 Nantmeal Rd., Glenmoore, PA (US) 19343; Peter Hoynash, Perkiomenville; Vincent F. Pettinato, Warminster, both of PA (US)

(73) Assignees: Ogontz Corporation, Willow Grove; Thomas M. Kenny, Glenmore, both of PA (US)

( * ) Notice: Subject to any disclaimer, the term of this patent is extended or adjusted under 35 U.S.C. 154(b) by 0 days.

(21) Appl. No.: 09/494,271

(22) Filed: Jan. 28, 2000

Related U.S. Application Data
(60) Provisional application No. 60/117,893, filed on Jan. 30, 1999.

(51) Int. Cl.$^7$ .......................... F16K 7/04; F16K 31/00; F16K 31/18; F16K 31/12

(52) U.S. Cl. ................................ 251/11; 251/4; 251/12

(58) Field of Search ................................ 251/4, 11, 12

(56) References Cited

U.S. PATENT DOCUMENTS

| | | | |
|---|---|---|---|
| 2,241,086 A | * | 5/1941 | Gould |
| 2,590,215 A | | 3/1952 | Sausa |
| 2,842,331 A | | 7/1958 | Anderson |
| 2,884,866 A | | 5/1959 | Patterson |
| 2,902,222 A | | 9/1959 | Noakes |
| 3,017,903 A | | 1/1962 | Steffens |
| 3,022,670 A | | 2/1962 | Sutliffe, Jr. |
| 3,145,967 A | | 8/1964 | Gardner |
| 3,353,560 A | | 11/1967 | McCulloch |
| 3,514,034 A | | 5/1970 | Cushman |
| 3,687,365 A | | 8/1972 | Laessig |
| 3,901,438 A | | 8/1975 | Christiansson |

(List continued on next page.)

OTHER PUBLICATIONS

Photocopy of guide "Steam and Steam Trapping", cover page and pp. 1–20, SPIRAX SARCO LTD>, 1982.
Photocopy of brochure "Bestobell Steam—Steam Traps and Steam Specialties", by Bestobell Steam (Admitted prior art).
Photocopies of invoices nos. 029989 dated Feb. 12, 1998; 029990 dated Feb. 12, 1998 and 030023 dated Feb. 20, 1998 for "for 1/2 Opt".
Photocopy of folder and contents titled "Pinch Steam Trap", by Ogontz Corporation, dated Nov. 18, 1997.

*Primary Examiner*—Kevin Shaver
*Assistant Examiner*—David A Bonderer
(74) *Attorney, Agent, or Firm*—Akin, Gump, Strauss, Hauer & Feld, L.L.P.

(57) ABSTRACT

A valve for automatically modulating a flow of a stream of fluid, the valve including a housing having a wall defining an interior cavity. The interior cavity is in fluid communication with the stream of fluid. A modulator is mounted within the interior cavity and includes a shell in fluid communication with the stream of fluid and a flexible flow adjustment member within the shell. The flexible flow adjustment member has a variable diameter passage therethrough which is also in fluid communication with the stream of fluid. A circumferential void is located between the flexible flow adjustment member and the shell and a thermally reactive material is within the void and in contact with the shell for thermal communication therebetween. A tool is used to assemble the valve. The tool includes a base plate, and a receiver adjacent to the base plate. The receiver has an internal passage therethrough for receiving a segmented cone having at least one radial cut therethrough. A longitudinal bore extends through the segmented cone and has a forming portion for imparting a shape to the valve.

5 Claims, 5 Drawing Sheets

U.S. PATENT DOCUMENTS

| | | |
|---|---|---|
| 4,114,640 A | 9/1978 | Forman |
| 4,454,983 A | 6/1984 | Tarvis, Jr. |
| 4,460,007 A * | 7/1984 | Pirkle .................... 137/79 |
| 4,569,502 A | 2/1986 | Elliott |
| 4,790,344 A | 12/1988 | Chauvier et al. |
| 4,877,053 A | 10/1989 | Yusko, Jr. et al. |
| 4,895,341 A | 1/1990 | Brown et al. |
| 4,899,783 A | 2/1990 | Yusko, Jr. et al. |
| 5,107,883 A | 4/1992 | Shaw |
| 5,546,757 A * | 8/1996 | Whipple, III .................. 62/225 |
| 6,102,897 A * | 8/2000 | Lang ....................... 604/246 |

\* cited by examiner

THERMALLY OPERATED VALVE FOR AUTOMATICALLY MODULATING THE FLOW OF FLUIDS AND METHODS AND TOOL FOR MAKING THE SAME

CROSS REFERENCE TO RELATED APPLICATION

This application is based on U.S. Provisional Application No. 60/117,893, filed Jan. 30, 1999.

BACKGROUND OF THE INVENTION

The present invention relates to thermally operated valves and, more particularly, to a thermally operated valve which automatically modulates the flow of fluids therethrough.

In the design, construction and operation of manufacturing, process and chemical plants, the control of fluid flow is a major concern to the design and operating engineer. It is also critical in environmental heating and cooling systems. The size and type of valves utilized at various control points result in a major portion of the cost of design and construction. In many applications it is desired to automatically control the flow of the fluid through a pipe, wherein the opening or closing action is effected directly by the temperature of the fluid flow being controlled. While one of the largest applications for this type of valve is the steam trap, there are many additional uses for valves of this type. For the purpose of clarification, the utility of the control valve of this invention will be described as it is applied to the steam trap application, but the control valves of this invention are not limited to that application.

In process or manufacturing plants, the steam trap provides an extremely important function. When operating properly and efficiently, it reduces the waste of energy and conserves heat energy in the system. However, when it is inoperable or performing inefficiently through corrosion, dirt, misuse, or simply through selection and installation of a valve of the wrong size or type, heat and energy losses are substantial. Steam, as it releases its heat units through process application, pipe radiation loss, or by other means, ultimately returns to its water or condensate state. If this condensate is not drained immediately or trapped from the system, it reduces the operating efficiency by slowing the heat transfer process and can actually cause physical damage to the equipment.

The condensate accumulates along the bottom of horizontal pipe and is swept along by the steam flow passing over it. Depending upon the volume and velocity, condensate may collect and fill the pipe, continuing to be swept along by the steam flow. If the velocity is sufficient, this water flow can do substantial damage to the equipment. It is therefore desirable in essentially all steam operated systems to remove the condensate as often and as efficiently as is practically possible. The condensate typically forms and collects at elevation changes such as risers and expansion loops, at all low points and on long horizontal runs and, of course, ahead of all dead-end areas, such as shut off valves, pressure and temperature control valves and at the ends of steam mains. In particular it is important to remove condensate ahead of humidifiers, pumps, turbines and other equipment where water droplets may damage the equipment. In order to improve efficiency, steam traps are used downstream from heat exchangers, coils, unit heaters, cooking kettles, dryers, and the like. The temperature at which the condensate is discharged may be quite important to maintaining energy efficiency.

With all these various uses and positions for steam traps in the process system, and because of the physical and performance limitations on the various types of steam traps, many different types have been designed and marketed. While all of the many different types of steam traps operate by sensing the difference between steam and condensate, they may be classified as density operated (mechanical), temperature operated (thermostatic) and kinetic energy operated (disc and orifice). All of these various types have been necessary because of the limitations of the performance of the traps and not necessarily due to the result of the specific operating principle involved. Thus, although the device of this invention is temperature operated, it does not necessarily fall into the same category or have the limitations of the temperature operated steam traps presently available which include the balance-pressure thermostatic traps and the thermostatic traps which are characterized as liquid-expansion and bi-metal expansion traps. The operation, advantages, and limitations of these various types of traps are well known to process engineers and are described in Bulletin Number T-511 printed April, 1979 by Sarco Company, 1951 26th Street, S.E., Post Office Box 119, Allentown, Pa. 18105, entitled "Steam Trap Selection and Application Guide," incorporated herein by reference. As will be clear from this "Guide," the choice of the particular kind of trap is important for the application and needs of the particular situation.

The "choice" problem relates not only to the type of trap, but also to the size of the trap, thereby requiring a thorough study of the rate of the expected flow and the characteristics of that flow before choosing the particular type and size of trap. These traps are expensive, complicated, and their selection involves a substantial portion of the total planning time in construction of a system. An incorrect choice of type or even size can result in poor performance or even complete lack of performance and could potentially damage equipment. Because of the nature of the device, it is common to use larger steam traps than necessary as they provide a substantial safety factor, and if the steam trap is found to be too small for the particular location, substantial expense and delay may be required before the system becomes operational. However, a trap having a capacity which is greater than system requirements may be energy inefficient and is certainly more costly. In addition, redundant systems are required because steam traps create notorious maintenance problems and are likely to need regular servicing. Strainer plugging is a common problem. As the steam trap ages, inefficiencies set in due to wear and due to deposition of various solids at the critical moving parts. It is common to fix or replace the steam traps in an entire system at regular intervals.

A particular problem with essentially all of the prior steam traps is determining how well the device is performing. In many applications, a substantial steam leak which results in energy losses cannot be easily detected. Such techniques as ultrasonic detection and other diagnostic tools are necessary to study the trap operation while "on stream." Many of the more costly and more efficient steam trap devices, however, are affected by particulates such as dirt or scale that might clog the working mechanism of the trap. This requires filtration upstream through the use of strainers and other such devices.

With the importance of energy conservation, particularly in process plant and boiler operations, even on a small scale, the steam trap and its efficient performance is a major concern. However, nothing has been offered as a satisfactory solution of various limitations of the presently available steam traps. These limitations include low thermal efficiency under varying loads and pressures, allowing steam loss during operation, the necessity of maintaining a water seal to avoid continuous discharge of steam, protection from freezing, limited discharge of condensate on a continuous basis, limited air venting capacity, inability to adjust the trap on-stream limited use with super heated steam, on-stream damage due to water hammer, closure of the trap due to failure, protection from any steam impingement that might damage the equipment, failure to be self-adjusting to various pressure changes of the steam flow, requiring an open discharge outlet at the site of use, inconsistent operation particularly upon aging, being limited to low pressure operation, the design or construction requiring continuous steam bleed resulting in substantial waste even with light loads, use of mechanical parts which are subject to sticking, water logging of the flow system because of condensate holdback, and being limited to certain inlet pressures. These limitations are not present in all types of steam traps, but each type of steam trap suffers with some of these limitations and even the best choice leaves some disadvantages.

None of the prior art devices have provided a solution to the limitations of the steam traps and control valves as outlined above. Accordingly, it is an object of this invention to provide a control valve that operates on the principle of temperature increase in a fluid stream to control the rate of flow of that fluid. The present invention provides a steam trap that does not use a mechanical float or thermo-expansion of a bellows to close or open a machined orifice with a tapered plug. Accordingly, this invention provides a steam trap design that is not prone to wear, plugging, or substantial maintenance problems relating to internal components of typical steam traps. Furthermore, the present invention provides a trap that is not affected by or subject to freezing, due to the requirement of a condensate reservoir or the internal design of the device. The present invention also vents all system air, accumulated water and non-condensables as soon as possible and provides a cold port opening through the steam trap. The present invention also provides a flow path adequate to pass particulates and fluid surges without clogging or restriction of flow.

The present invention is multipurpose in nature, such that it may be used with a wide range of condensate flow rates, operating pressures, pipe sizes and system applications. Further, the present invention provides a trap with essentially no metal wear parts, and which is capable of insertion in-line and is compact in size by comparison with present steam traps.

The present invention also operates such that cooler temperatures expand the orifice and increase flow through the trap to provide a quick and complete discharge of condensate liquid, particularly on start-up conditions. Unlike prior art devices, the present invention provides very rapid response to direct steam contact with the trap and to changes in the temperature of the flow generally. Further, the valve of the present invention provides a closure valve that will compensate for erosion of the inside surface to prevent leakage. For increased safety over prior art designs, the valve of the present invention will not remain in the closed position in the event of a failure, but will return to the open position. For increased economic efficiency, the valve of the present invention has a long performance life and will be less expensive to install and operate.

BRIEF SUMMARY OF THE INVENTION

A valve for automatically modulating a flow of a stream of fluid, the valve including a housing having a wall defining an interior cavity. The interior cavity is in fluid communication with the stream of fluid. A modulator is mounted within the interior cavity and includes a shell in fluid communication with the stream of fluid and a flexible flow adjustment member within the shell. The flexible flow adjustment member has a variable diameter passage therethrough which is also in fluid communication with the stream of fluid. A void is located between the flexible flow adjustment member and the shell and a thermally reactive material is within the void and in contact with the shell for thermal communication therebetween.

In another aspect, the present invention is directed to a method of making a valve for automatically modulating a flow stream of fluid. The method includes positioning a flexible flow adjustment member within a shell and positioning a thermally reactive material between the flexible flow adjustment member and the shell. The method also includes sealing the thermally reactive material between the flexible flow adjustment member and the shell and mounting the shell within a housing such that the shell is in fluid communication with the flow of the stream of fluid.

In another aspect, the present invention is directed to a tool for assembling a valve. The tool includes a base plate having a first end and an opposing second end and a receiver having an internal passage therethrough. The receiver also includes a first end and an opposing second end. The internal passage includes a first conical portion adjacent to the first end of the receiver, a first cylindrical portion adjacent to the first conical portion, a second conical portion adjacent to the first cylindrical portion, and a second cylindrical portion adjacent to the second conical portion and the second end of the receiver. The first end of the receiver is adjacent to the second end of the base plate. The tool also includes a segmented cone having a first end, an opposing second end, and a longitudinal bore therethrough. The segmented cone includes an outer surface having a first frusto-conical surface adjacent to the first end of the segmented cone, a cylindrical surface adjacent to the first frusto-conical surface, and a second frusto-conical surface adjacent to the cylindrical surface and to the second end of the segmented cone. There is at least one radial cut through the segmented cone for permitting a decrease in a diameter of the longitudinal bore. The longitudinal bore includes a forming portion for imparting a shape to a shell. The segmented cone is positioned within the internal passage of the receiver such that the first conical portion of the receiver is adjacent to the first frusto-conical surface of the segmented cone, the first cylindrical portion of the receiver is adjacent to the cylindrical surface of the segmented cone, and the second conical portion of the receiver is adjacent to the second frusto-conical surface of the segmented cone. The first end of the segmented cone is adjacent to the second end of the base plate.

BRIEF DESCRIPTION OF THE SEVERAL VIEWS OF THE DRAWINGS

The foregoing summary, as well as the following detailed description of the preferred embodiment of the invention, will be better understood when read in conjunction with the appended drawings. For the purpose of illustrating the invention, there is shown in the drawings an embodiment which is presently preferred. It should be understood, however, that the invention is not limited to the precise arrangements and instrumentalities shown. In the drawings.

DETAILED DESCRIPTION OF THE INVENTION

As used in the claims, "a" is defined as "at least one".

Figure 1:
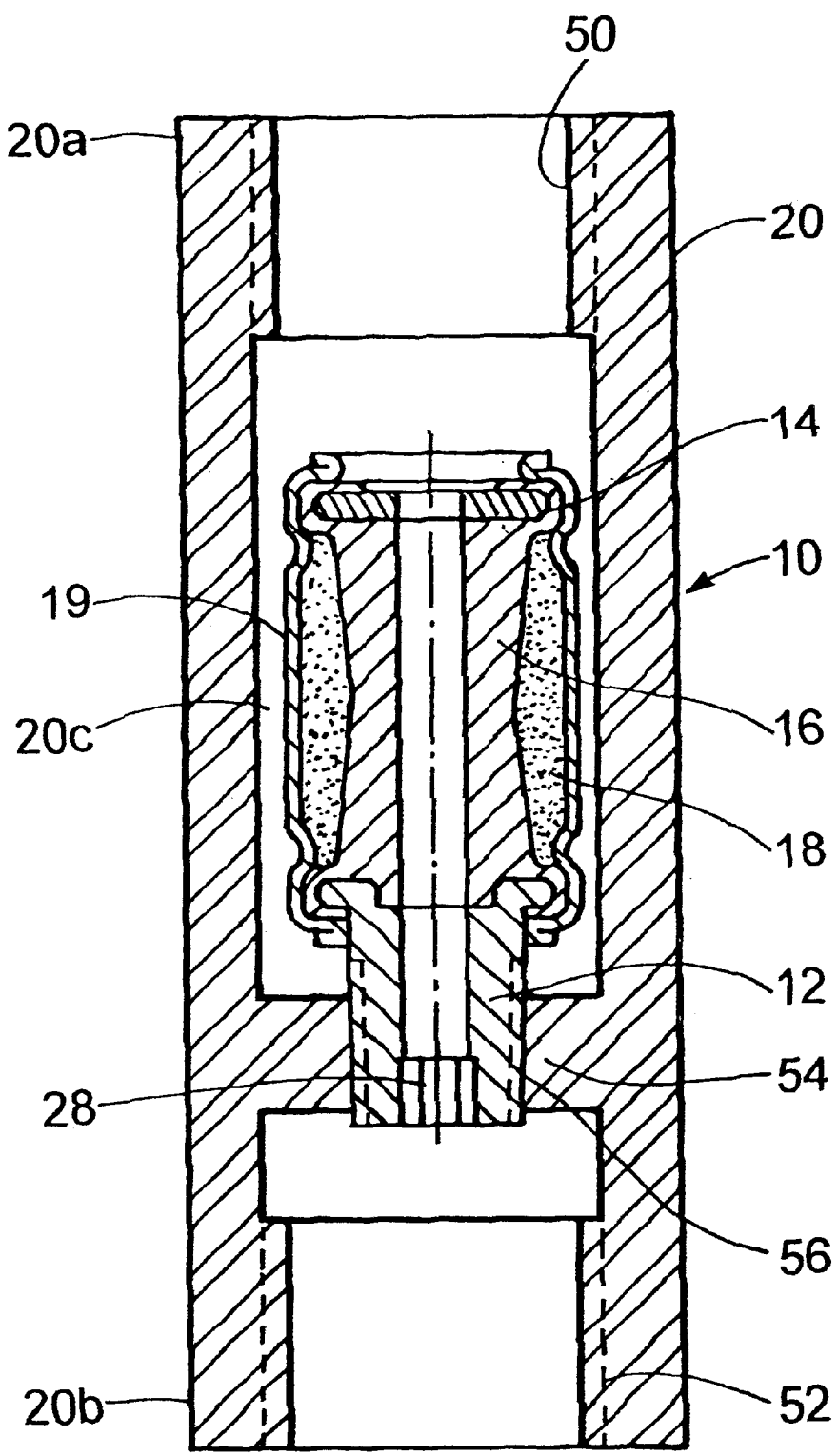
FIG. 1 is a cross-sectional view of a thermally operated valve in accordance with a preferred embodiment of the present invention.

In the drawings, like numerals are used to indicate like elements throughout. Referring to the drawings in detail, there is shown in FIG. 1 a cross-sectional view of a valve 10 in accordance with the present invention. The valve 10 includes a flanged nipple 12, an end washer 14, a flexible flow adjustment member 16, thermally reactive material 18, a shell 19, and a housing 20.

Figure 2:
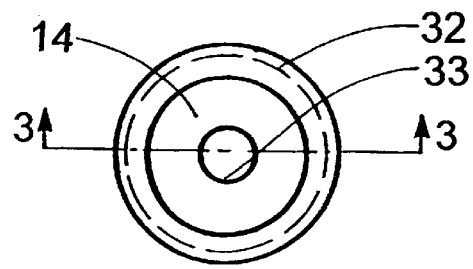
FIG. 2 is a top plan view of a modulator positioned within the thermally operated valve shown in FIG. 1 taken along line 2—2 of FIG. 1.
Figure 4:
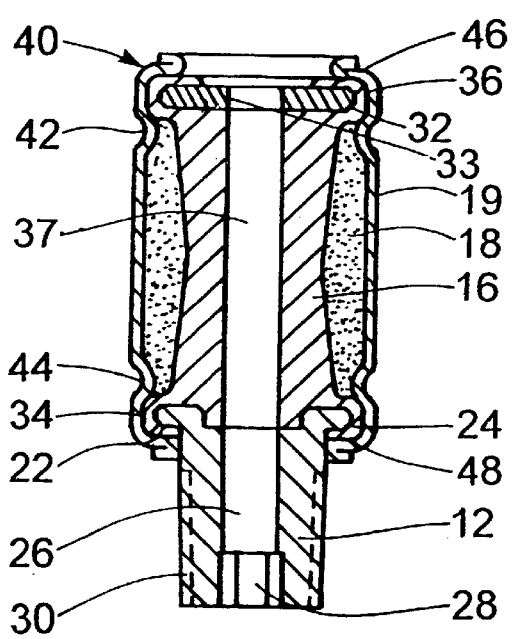
FIG. 4 is a complete cross-sectional view of the modulator for the thermally operated valve shown in FIG. 2 taken along line 3—3 of FIG. 2.
Figure 3:
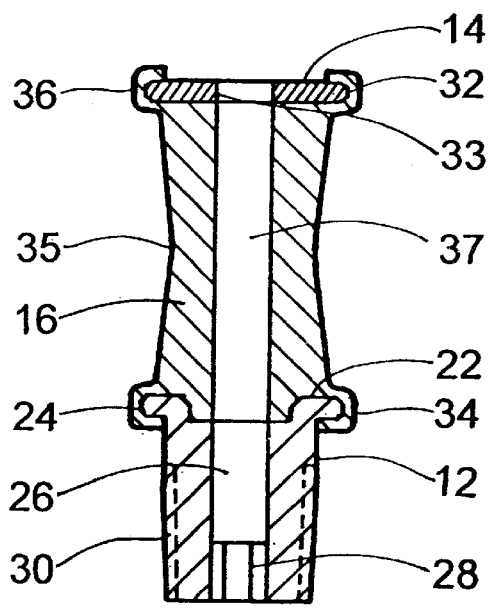
FIG. 3 is a partial cross-sectional view of the end washer, flexible flow adjustment member and flanged nipple of the modulator shown in FIG. 2 taken along line 3—3 of FIG. 2.

Referring now to FIGS. 2–4, the flanged nipple 12 is positioned adjacent to a first end of the flexible flow adjustment member 16, and is preferably made of brass by methods, such as machining, well-known to those of ordinary skill in the art. Alternatively, the flanged nipple 12 could be made of bronze, copper, polymeric material, stainless steel or one of a number of other materials well known to those of ordinary skill in the art to offer structural strength, thermal stability, and resistance to corrosion. The flanged nipple 12 has on a first end a flange 22 which is sealingly engaged with a first end of the flexible flow adjustment member 16, as will be discussed more fully below. The outer circumferential edge 24 of the flange 22 is preferably circular and the edges of the outer circumferential surface 24 are preferably chamfered, for reasons which will become apparent when discussed below. The flanged nipple 12 has a bore 26 centrally disposed therethrough which permits the passage of gasses, vapors, liquids, and mixtures of these through the flanged nipple 12 and into the flexible flow adjustment member 16. The size of the bore 26 can be varied depending upon the flow capacity desired of the valve 10. Preferably, the bore 26 is approximately 0.156 inches in diameter. When used as a "steam trap," a bore 26 of this size can accommodate flow rates of up to approximately three hundred and forty (340) pounds per hour of condensate. It will be obvious to those of ordinary skill in the art having read this disclosure that a larger diameter bore 26 would permit greater flow rates and a smaller diameter would permit lesser flow rates.

A second end of the flanged nipple 12 opposite the flange 22 has external threads 30 on its outer surface for attachment to the housing 20, as described herein. In the preferred embodiment, the external threads 30 are American National Standard Taper pipe threads made pursuant to ANSI/ASME B1.20.1-1983, having a taper of one in sixteen or 0.75 in/ft. Preferably the external threads 30 are ⅛-27 NPT male pipe threads, however, the pipe threads may be any size that will accommodate the desired diameter of the bore 26 and that will accommodate pressure-tight attachment to the housing 20. Alternatively, the flanged nipple 12 could have female threads (not shown) which would mate with male threads (not shown) on the housing 20, or the union between the flanged nipple 12 and the housing 20 could be one of a number of alternative configurations known to those of ordinary skill in the art such as a compression-type fitting, pressed fitting, or crimped fitting. Opposite the flange 22, the bore 26 includes a hexagonal interior shape 28. This hexagonal interior shape 28 is sized to fit a standard hex key or Allen wrench (not shown) used for applying torque to the flanged nipple 12 for assembly of the valve 10, which will be described fully below. Use of a hexagonal interior shape 28 and a hex key is the preferred method for installation of the flanged nipple 12 into the housing 20, however, other features that would facilitate installation of the flanged nipple 12 into the housing 20 could be used. For instance, a slotted end on the flanged nipple 12 could be used without departing from the spirit and scope of the invention.

Spaced apart from the flange 22 at the opposite end of the flexible flow adjustment member 16 is a flat end washer 14 having an orifice 33 therethrough. The end washer 14 is preferably made from brass, and made by a machining process, but may be made from any material which will be substantially dimensionally stable and rigid throughout the intended temperature range in which the valve 10 will be used, such as stainless steel and by any conventional process known to those of ordinary skill in the art for making flat washers. The outer circumferential edge 32 of the end washer 14 is preferably the same size and shape as the outer circumferential edge 22 of the flange 22. Those of ordinary skill in the art will recognize upon reading this disclosure that the two outer circumferential edges 22, 32 need not be the same diameter but could have diameters different from one another if accommodation is made in the flexible flow adjustment member 16 and shell 19, as will become apparent below. The edges of the outer circumferential edge 32 of the end washer 14 are preferably chamfered for reasons which will be discussed below. The end washer 14 has an orifice 33 therethrough. The orifice 33 is in fluid communication with the variable diameter passage 37 and the bore 26. The orifice 33 preferably is the same size as the bore 26, but may alternatively be larger than the bore 26 without departing from the spirit and scope of the invention. It is desired, however, that the orifice 33 not be smaller than the diameter of the bore 26, otherwise the end washer 14 may undesirably restrict flow through the valve 10.

The flexible flow adjustment member 16 is located essentially between the end washer 14 and the flange 22 and preferably encompasses at least the outer circumferential edges 24, 32 of the flange 22 and end washer 14, respectively, for reasons that will be discussed below with regard to assembly. In the preferred embodiment, the portion of the flexible flow adjustment member 16 which encircles the outer circumferential edges 24, 32 of the flange 22 and end washer 14 respectively is at least 0.0625 inches thick to provide sealing surfaces 34, 36 on the flange 22 and end washer 14, respectively. Those of ordinary skill in the art will recognize having read this disclosure that the thickness may be either more or less than 0.0625, so long as there is a sufficient thickness of material covering the outer circumferential edges 24, 32 to form a pressure-tight seal between the flexible flow adjustment member 16 and the shell 19, thereby creating a sealed void 17 between the flexible flow adjustment member 16 and the shell 19, as discussed below. It is contemplated that the flexible flow adjustment member 16 need not be interposed between the shell 19 and outer circumferential edges 24, 32, and that the sealed void 17 may be created by any method that would provide a sealed region between the shell 19 and flexible flow adjustment member 16 such as by sealing the flexible flow adjustment member 16 directly to the shell 19 without the use of an end washer 14 or flanged nipple 12 (not shown).

The flexible flow adjustment member 16 must be selected to have the necessary closure and opening capabilities through a range of temperatures and provide a long life upon steady exposure to fluids, etc., at elevated temperatures. The flexible flow adjustment member 16 is made of an elastomeric material, preferably Viton elastomeric material, such as GF300 manufactured by E. I. duPont de Nemours & Co., Inc. located in Wilmington, Del., but may be made from other resilient materials well known to those of ordinary skill in the art such as neoprene, butyl rubber, silicone, urethane rubber, EPDM, Hypalon, Viton-A, Viton-B, and Nordel elastomers. Hypalon, Viton-A, Viton-B and Nordel are also manufactured by E. I. duPont de Nemours & Co., Inc. located in Wilmington, Del. In a preferred embodiment, the flexible flow adjustment member 16 is made by a process of molding, wherein the flanged nipple 12, end washer 14, and flexible flow adjustment member 16 are assembled together as a unitary piece, as best shown in FIGS. 2 and 3.

A variable diameter passage 37 passes longitudinally through the flexible flow adjustment member 16, thereby providing a constrictable flow path through the valve 10 in fluid communication with the stream of fluid through the valve 10, the orifice 33, and the bore 26. The means of constricting the variable diameter passage 37 will be described below. Preferably, the variable diameter passage 37 has a diameter equal to that of the bore 26 through the flanged nipple 12 to minimize turbulence through the valve 10. Those of ordinary skill in the art will recognize upon reading this disclosure that the variable diameter passage 37 may be larger than the diameter of the bore 26 if the bore 26 alone is desired to control maximum flow rate through the valve 10, and may be smaller than the diameter of the bore 26 if the variable diameter passage 37 alone is desired to control maximum flow rate. In a preferred embodiment, wherein the valve 10 is to be used as a steam trap, the variable diameter passage 37 is preferably 0.156 inches in diameter and will provide a maximum flow rate of up to three hundred and forty (340) pounds per hour of condensate. However, those of ordinary skill in the art will recognize that the variable diameter passage 37 may be of any diameter that will permit a predetermined flow through the valve 10 and will permit the diameter to be reduced to a point where flow through the valve 10 is terminated, as described below. One substantial benefit of the nature of the material and construction of the flexible flow adjustment member 16 is the ability to seal off flow tightly even if contamination such as dirt is present in the variable diameter passage 37.

The outer circumference of the flexible flow adjustment member 16 is preferably reduced at its longitudinal midpoint 35 to facilitate compression (described more fully below) in that region of the flexible flow adjustment member 16, thereby facilitating the reduction in or termination of flow through the valve 10. The region of reduced outer circumference also creates the inner boundaries of the sealed void 17 between the flexible flow adjustment member 16 and the shell 19 wherein the thermally reactive material 18 is encapsulated thus positioning the thermally reactive material 18 in contact with the shell 19 and the flexible flow adjustment member 16. It will be recognized by those of ordinary skill in the art upon having read this disclosure that the flexible flow adjustment member 16 need not have a region of reduced outer circumference at its midpoint 35, but may have an outer diameter that is equivalent across substantially the entire distance between the end washer 14 and the flange 22.

Reference is now made to FIG. 4. A shell 19 sealingly engages the sealing surfaces 34, 36 and in its unbent form (not shown) extends at least 0.0625 inches beyond each end of the flexible flow adjustment member 16. The shell 19 is essentially a short length of tube, and is preferably of round cross-section where, as discussed above, the flange 22 and end washer 14 are made in a preferred circular shape. The shell 19 preferably has a slip fit over the flexible flow adjustment member 16 such that the shell may be slipped over the flexible flow adjustment member 16 from an end of the flexible flow adjustment member 16. The shell 19 is preferably made of brass, however, those of ordinary skill in the art having read this disclosure will recognize that the shell 19 could be made from any malleable metal which has high thermal conductivity, such as stainless steel. The malleability of the material is important due to the method of attaching the shell 19 to the flexible flow adjustment member 16, discussed below. High thermal conductivity is important because, in a thermally-reactive valve such as the present invention, temperature changes must be rapidly detected and reacted to by the valve 10. It is also preferred that the shell 19 has a high degree of corrosion resistance. This may dictate different materials depending upon the environment in which the valve 10 is used. The wall thickness of the shell 19 should be sufficient to resist the expansive forces of the thermally reactive material 18 upon heating, as compared to the flexible flow adjustment member 16. Preferably, the wall thickness of the shell 19 is 0.032 inches. The wall thickness of the shell 19 can be varied, thereby varying the thermal conductivity of the shell 19, to impart different temperature-reactive characteristics to the valve 10, thicker wall thickness providing a slower response time, thinner wall thickness providing a more rapid response. This provides the designer with the ability to custom design the response rate of the valve 10 for different applications. The thermal reactivity of the valve 10 can also be manipulated by employing different insulating or conductive coatings on the shell 19. Examples of such coatings are ceramic or PTFE.

As best shown in FIGS. 1 and 4, the thermally reactive material 18 encircles the flexible flow adjustment member 16 in the sealed void 17 created between the shell 19 and the outer surface of the flexible flow adjustment member 16. While it is preferred that the void 17, and hence the thermally reactive material 18 encircle the flexible flow adjustment member 16, it is contemplated that the void 17 need not completely encircle the flexible flow adjustment member 16, but need only be in contact with a sufficient portion of the flexible flow adjustment member 16 to cause constriction and to permit expansion in response to changes in temperature and pressure of the flow stream through the valve 10. The thermally reactive material 18 of the preferred embodiment is made from temperature sensitive hydrocarbon wax. The material used as the thermally reactive material 18 must expand when subjected to a temperature increase and, therefore, must have a high coefficient of thermal expansion. It is preferably completely noncompressible, but a small amount of vaporization or a small amount of gas in the system is not an absolutely critical defect. Generally the higher the coefficient of thermal expansion of the material selected, the smaller the sealed void 17 need be. When the thermally reactive material 18 is a solid such as temperature sensitive hydrocarbon wax, it is preferably split along its length to create two semi-circular pieces (not shown) that would facilitate assembly of the thermally reactive material onto the outer surface of the flexible flow adjustment member 16. These semi-circular pieces can either be made from a process wherein each is molded separately, or could be made from a process wherein a full circumferential tube of the material is cut in two places along its entire length to form the two semi-circular pieces. When the thermally reactive material 18 is made from a solid material such as temperature sensitive hydrocarbon wax, the outer diameter of the thermally reactive material 18 must not be greater than the outer diameter of the flexible flow adjustment member 16, so that the shell 19 may be slipped over the flexible flow adjustment member 16 and thermally reactive material 18.

Using a thermally reactive material 18 having different thermal expansion characteristics permits the designer to custom design the valve 10 for different applications. The thermally reactive material 18 having the physical characteristics described above may be other than temperature sensitive hydrocarbon wax. Such materials include water, alkylene glycols, including ethylene glycol, propylene glycol, diethylene glycol and the like, alcohols including methanol, ethanol, propanol, butanol and the like, and mixtures of the above and with other chemical compounds; fluorinated and chlorinated hydrocarbons commonly known in the field as FREON compounds, a registered trademark of E. I. duPont de Nemours & Co., Inc., located in Wilmington, Del., and compounds well known to those of ordinary skill in the art as substitutes or environmentally benign replacements for such FREON-type compounds. Changing the nature of the thermally reactive material 18 permits changes in the degree and rate of response to various changes in temperature and, therefore, allows the valve 10 to be used in different applications.

When the flexible flow adjustment member 16, thermally reactive material 18, end washer 14, flanged nipple 12, and shell 19 are assembled as shown in FIG. 4, they form a modulator 40. The modulator 40 is mounted within the interior cavity 20xc, within the flow stream of fluid passing through the valve 10. Referring now to FIG. 4, the modulator 40 is assembled as follows. As discussed above, the thermally reactive material 18, which is preferably made from two semi-circular pieces, is placed over the flexible flow adjustment member 16 and the shell 19 is then slipped over the flexible flow adjustment member 16 and thermally reactive material 18. This assembly comprising the shell 19, flanged nipple 12, end washer 14, flexible flow adjustment member 16, and thermally reactive material 18 is then placed in a compression tool 100 (shown in FIG. 5 and described below) wherein the sleeve 19 is compressed or crimped onto the assembled flexible flow adjustment member 16, end washer 14 and flanged nipple 14 such that the inner circumference of the shell 19 forms a pressure-tight seal with the sealing surfaces 34, 36 of the flexible flow adjustment member 16. It will now become apparent that the flange 22 and end washer 14 provide a rigid backing, holding the flexible flow adjustment member 16 in sealing engagement with the inner circumference of the shell 19. This sealing engagement is enhanced due to the shape of the compressed portion of the shell 19, having circumferential indentations 42, 44 immediately inboard from the end washer 14 and flange 22, respectively, and rounded over ends 46, 48 immediately outboard from end washer 14 and flange 22, respectively. Those of ordinary skill in the art upon reading this disclosure will recognize that other methods of creating a pressure tight void 17 between the shell 19 and the flexible flow adjustment member 16 could be employed, such as through the use of a compression type fitting or threaded fitting. The modulator 40 is installed in the interior cavity 20c of the housing 20 such that the shell 19 is in fluid communication with the stream of fluid through the valve 10.

Referring now to FIG. 1, the housing 20 provides for attachment of the valve 10 to tubing or piping (not shown) of the system into which valve 10 is integrated. The housing 20 has a wall 20d forming an interior cavity 20c, an inlet end 20a and an outlet end 20b. The interior cavity 20c is in fluid communication with the stream of fluid passing through the valve 10. The housing 20 is preferably generally tubular and has a hexagonal outer shape (not shown) to facilitate gripping the housing 20 with a wrench. It will be recognized by those of ordinary skill in the art upon reading this disclosure that the outer shape need not be hexagonal, but may be round and, in such a case, could be gripped by a pipe wrench or similar tool. The housing 20 is preferably made from stainless steel, but those of ordinary skill in the art will recognize that other materials, including bronze or polymeric materials, offering high tensile strength and corrosion resistance that would be required in a coupling operating in a harsh environment would also suffice.

Preferably, each end of the housing 20 has internal threads 50, 52 which permit attachment to tubing of the system into which the valve 10 is integrated. The threads 50, 52 are preferably American National Standard Taper pipe thread (ANSI/ASME B1.20.1-1983) having a size of ½-14 NPT. Those of ordinary skill in the art upon reading this disclosure will recognize that the threads 50, 52 could be either internal or external threads and could be any size that would permit the level of flow for which the valve 10 is rated.

The housing 20 has in its interior cavity 20c, a radially inwardly extending throat 54 which is used as the point of attachment for the threaded end of the flanged nipple 12. The throat 54 is preferably unitary with the housing 20 and preferably has threads 56 which correspond with the external threads 30 on the flanged nipple 12. As stated above, those of ordinary skill in the art upon reading this disclosure will recognize that alternate means of attaching the flanged nipple 12 to the housing 20 may be employed, such as by using a pressed or compression type arrangement. The throat 54 is preferably located nearer one end of the housing 20 such that when the modulator 40 is installed into the housing 20, the modulator 40 is positioned within the interior cavity 20c essentially equidistant from both ends of the housing 20. Those of ordinary skill in the art, upon reading this disclosure, will recognize, however, that the throat 54 need not be located to keep the modulator 40 centrally disposed, but could be located such that the modulator is disposed more toward one end of the housing 20 than the other without departing from the spirit and scope of the invention.

The valve 10 of the preferred embodiment is generally configured or assembled as follows. The modulator 40 is first assembled from its component parts. The flange 22 of the flanged nipple 12 is positioned adjacent to one end of the flexible flow adjustment member 16 and the end washer 14 is positioned adjacent to the opposing end of the flexible flow adjustment member 16. A portion of the flexible flow adjustment member 16 encircles the outer circumferential edge 24 of the flange 22 and the outer circumferential edge 32 of the end washer. The thermally reactive material 18 is positioned around the outer circumference of the flexible flow adjustment member 16. The shell 19 is then slipped over the assembled components and the ends of the shell are compressed (as described in detail below) such that the thermally reactive material 18 is sealed in the void 17 between the shell 19 and the flexible flow adjustment member 16. Detailed assembly of the housing 20 and modulator 40 of the preferred embodiment is preferably accomplished as follows. The threads 30 of the flanged nipple 12 are threaded into the corresponding threads 56 in the throat 54 of the housing 20 by inserting a hex key (not shown) into the housing 20 through the second end 20b of the housing such that it engages the hex portion 28 at the end of the bore 26 wherein the hex key is then used to tighten the modulator 40 within the housing 20. A pipe thread compound (not shown) or Teflon tape (not shown) is not used to seal the threaded joint between the modulator 40 and the throat 54 because the threads are of the dry seal type. Alternatively, such sealing features could be used if desired.

Referring now to FIGS. 1 and 4, when used as a steam valve, the preferred embodiment of valve 10 operates as described herein. As hot water condensate (not shown) flows through a steam line (not shown) it passes through the inlet end 20a of the housing 20 into the cavity 20c. The condensate fills the cavity 20c surrounding the shell 19 and passing through the variable diameter passage 37, bore 26 and out of the valve 10. As the flow turns to steam (not shown), the increased temperature rapidly heats the thermally reactive material 18 because it is in direct contact with the shell 19. Due to its physical characteristic of having a high degree of thermal expansion, the thermally reactive material 18 causes the pressure in the sealed void 17 between the shell 19 and flexible flow adjustment member 16 to increase dramatically. That increase in pressure exerts force on the outer circumferential surface of the flexible flow adjustment member 16, which in turn constricts the variable diameter passage 37 to a point where flow through the valve 10 is stopped. When the steam line is no longer carrying steam, the variable diameter passage 37 quickly opens due to a drop in pressure exerted on the flexible flow adjustment member 16 by the thermally reactive material 18 because it is in direct contact with the shell 19. Thus, as one of ordinary skill in the art will recognize having read this disclosure, the valve 10 is quick acting and self-regulating, such that the modulator 40 begins to automatically pinch off or open the variable diameter passage 37 as the thermally reactive material 18 expands with the passage of hot materials and contracts with the passage of cooler materials.

The self-modulating action of the valve 10 also provides the benefit of minimizing failure caused by contamination such as dirt or scale (not shown). If dirt or scale particles begin to plug the variable diameter passage 37, the valve 10 will cool because of the reduced flow, the thermally reactive material 18 will contract, and the variable diameter passage 37 will begin to open, allowing the contamination to pass. The variable diameter passage 37 will then adjust back to its original modulated size based on the load.

It will be recognized that the design of the valve 10 described hereinabove provides the substantial benefit of greatly increased life compared with prior art designs. The valve 10 allows a continuous flow of low-velocity condensate when used as a steam valve, such that there is no wear caused by cycling on and off. Responding automatically to condensate temperatures, the valve 10 also greatly reduces the cost of installing and maintaining traps (not shown), eliminates down time in systems and product loss due to failed traps or valves of prior art designs, and greatly increases energy efficiency by eliminating live steam loss. The reaction time is less than that of prior art designs due to the immersion of the shell 19 in the fluid medium reaching the valve 10. When used as a steam trap, the increased efficiency and capacity of the valve 10 of the present invention, when compared with prior art designs, can provide substantial benefits when used in such applications as drip legs, winterizing steam tracing, process steam tracing, maintaining analyzer sample lines, or when used in autoclaves, radiators, or for instrument enclosure heater discharge.

Alternative uses for the valve of the present invention are temperature control, freeze protection and scald protection.

Referring now to FIGS. 5–7 and 11, as stated above, the shell 19 is compressed onto the remainder of the modulator 40 through the use of a compression tool 100. The compression tool includes a base plate 164 having a first end 164a and an opposing second end 164b, and a segmented cone 102 which sits atop the base plate 164 and within which is disposed a modulator 40 for compression of its shell 19. A retainer plate 162 is disposed atop the base plate 164 and a receiver 124 is seated upon and fastened to the retainer plate 162 and is disposed radially outwardly from the segmented cone 102. An end plug 142 is attached to the second end 124b of the receiver 124. Disposed adjacent to the end plug 142 and within the receiver 124 and adjacent to the second cylindrical portion 128 is a plunger 152 and first resilient member 154. The first resilient member 154 contacts the end plug 142 at one end and at its opposite end contacts the plunger 152. The plunger 152 contacts the first resilient member 154 at its upper end and the second end 102a of the segmented cone 102 at its lower end. A second resilient member 123 is disposed within a longitudinal bore 112 of the segmented cone 102 and elastic members 125 are disposed within the segmented cone 102 as further described below.

Figure 5:
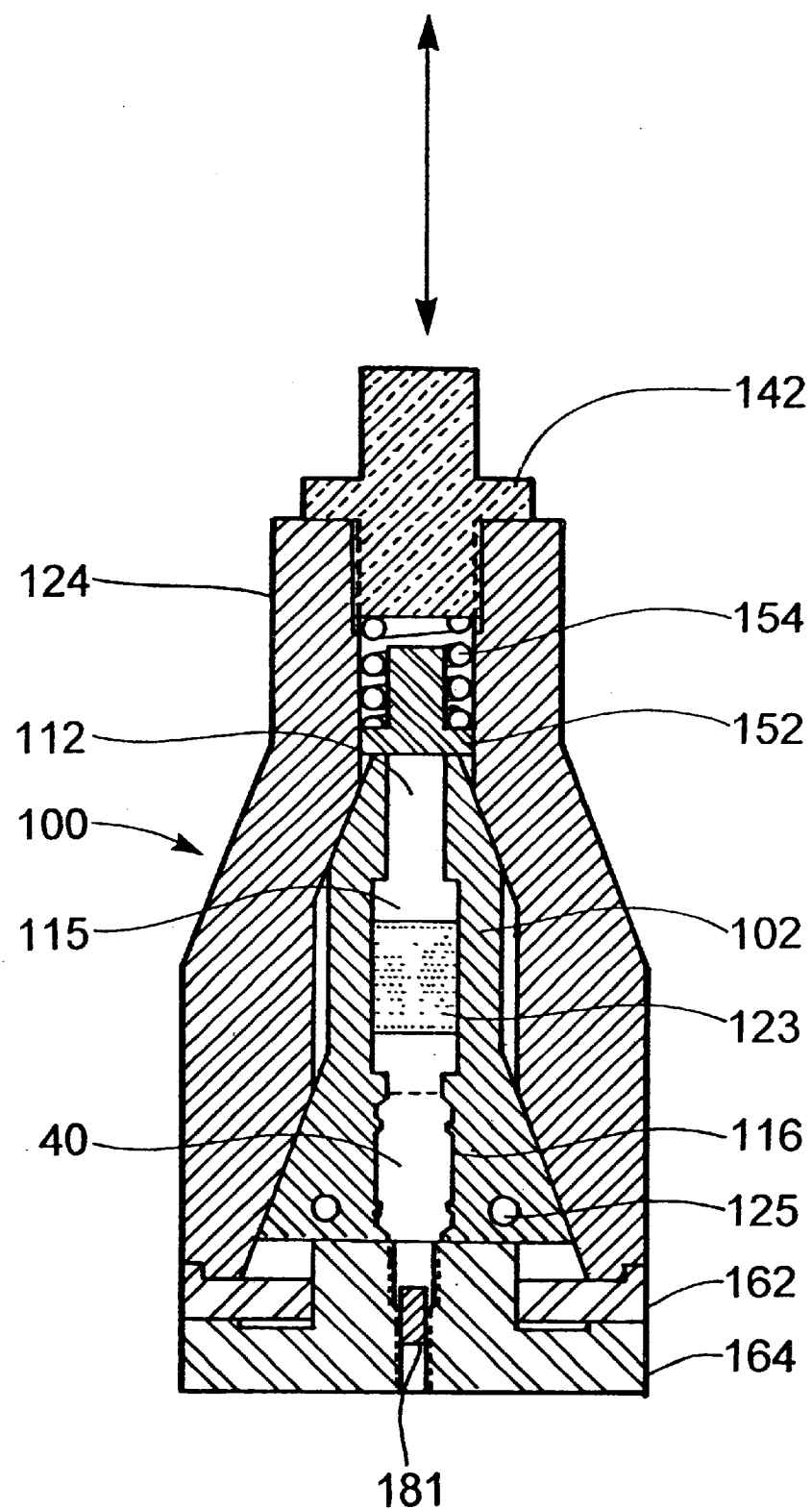
FIG. 5 is a cross-sectional view of a preferred embodiment of a compression tool used to assemble the modulator shown in FIG. 4.
Figure 6:
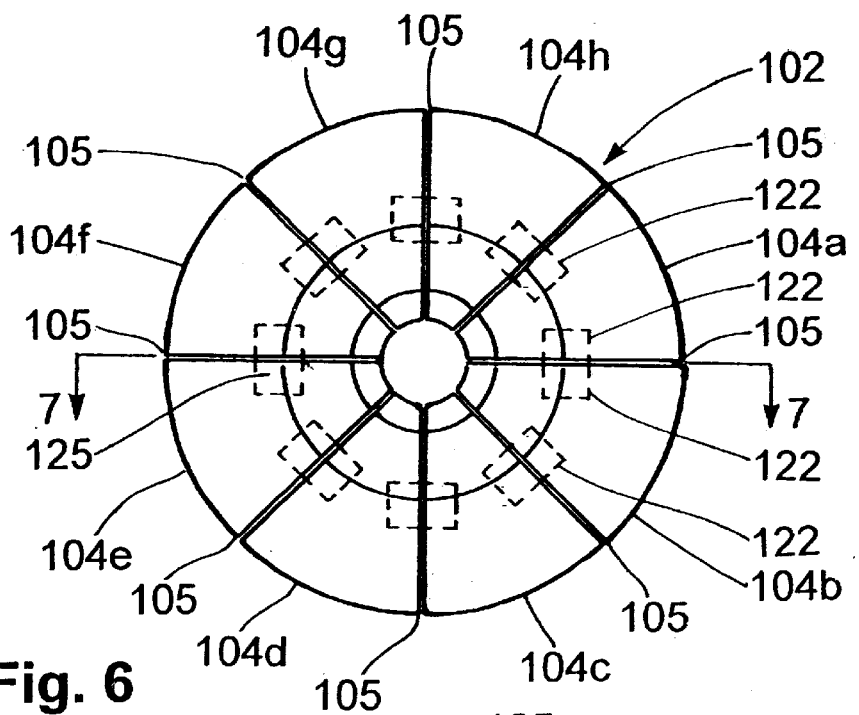
FIG. 6 is a top plan view of a segmented cone assembly of the compression tool shown in FIG. 5.
Figure 7:
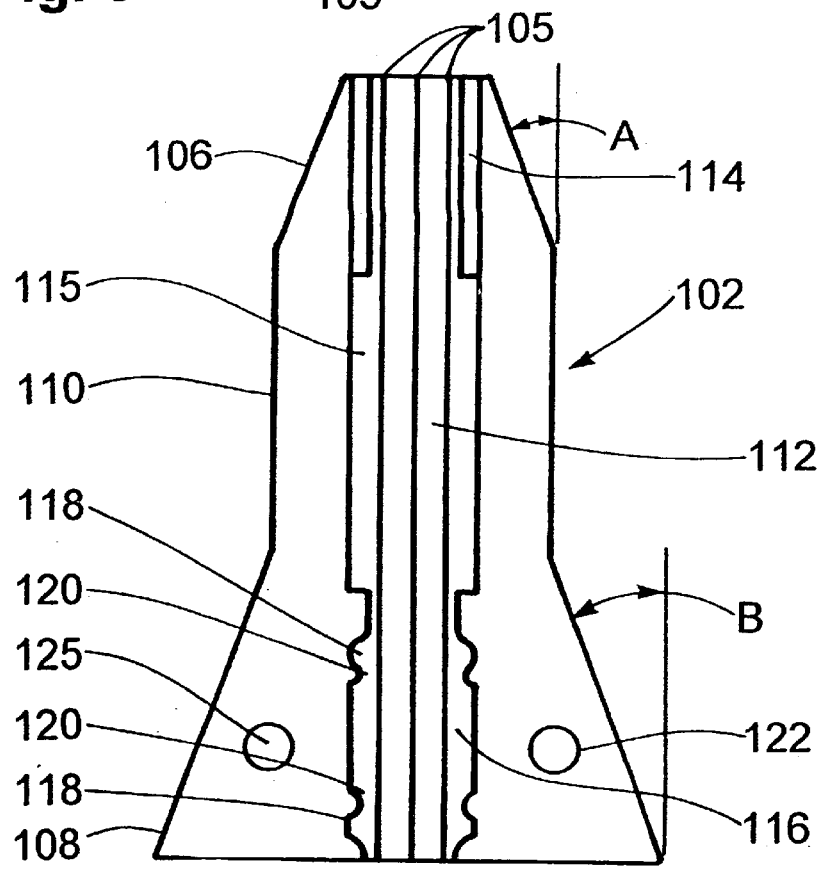
FIG. 7 is a cross-sectional view of the segmented cone assembly shown in FIG. 6 taken along line 7—7 of FIG. 6.

Referring now to FIGS. 5–7, the segmented cone 102 has a first end 102a and an opposed second end 102b and consists of eight longitudinal segments 104a through 104h. The individual segments 104a through 104h are preferably made by making radial cuts 105 through a unitary segmented cone (not shown) such that each segment 104a through 104h has two longitudinal faces 103 and the longitudinal face 103 of one longitudinal segment 104a through 104h is adjacent to the longitudinal face 103 of the adjacent longitudinal segment 104a through 104h. A description of the method of making the cuts is omitted for purposes of brevity as such methods are well known to those of ordinary skill in the art. Preferably the cuts through the unitary segmented cone are 0.025 inches wide. Those of ordinary skill in the art will recognize upon reading this disclosure that the cuts need not be 0.025 inches wide, but may be any width that permits the segmented cone 102 to compress the shell 19 yet remain relatively easily retractable, once compression of the shell 19 is complete. The segmented cone 102 is preferably made of a high-strength light-weight material, such as AH-5 tool steel having a hardness of Rc 55-58.

Referring now to FIG. 7, the outer shape of the segmented cone 102 consists of a second frusto-conical surface 106 adjacent to the second end 102b of the segmented cone 102, a first frusto-conical surface 108 adjacent to the first end 102a of the segmented cone 102, and a cylindrical surface 110 disposed therebetween. The second frusto-conical surface 106 and first frusto-conical surface 108 have angles of inclination A, B of 20 degrees. Those of ordinary skill in the art upon reading this disclosure will recognize that the angle of inclination A, B of the second and first frusto-conical surfaces 106, 108 should be identical or nearly identical to provide uniform compression along the length of the shell 19 (as will be discussed below) but may be other than twenty degrees without departing from the spirit and scope of the invention. A longitudinal bore 112 passes longitudinally through the center of the segmented cone 102. At the end of the longitudinal bore 112, corresponding with the second frusto-conical surface 106, is an internal throat 114, the function of which will become apparent below. At the opposite end of the longitudinal bore 112 is the forming section 116, which imparts the final formed shape to the shell 19 in the process described below. The forming section 116 includes two circumferential channels 118 and two circumferential ridges 120, the combination of which form the circumferential indentations 42, 44 (best shown in FIG. 4) and rounded over ends 46, 48 on the shell 19.

Each segment 104a through 104h of a preferred embodiment of the segmented cone 102 has a cavity 122 in each longitudinal face 103 which corresponds with and opposes a cavity 122 on the adjacent, opposing longitudinal face 103. Preferably, the cavities 122 are flat bottomed. Disposed within each opposing pair of cavities 122 in adjacent longitudinal faces 103 of segments 104a through 104h are the elastic members 125, which assist in maintaining proper spacing of the segments 104a through 104h during assembly of the compression tool 100 and subsequent compression of the shell 19. Consistent spacing of the segments 104a through 104h assists in distributing the compressive load on the shell 19 evenly around the circumference of the shell 19. The elastic members 125 provide the additional benefit of assisting in separating the segments 104a through 104h following compression of the shell 19. The elastic members 125 are generally cylindrically shaped and are made of elastomeric material which preferably is rubber. Those of ordinary skill in the art will recognize upon reading this disclosure that other means could be used to properly space and separate the segments 104a –104h, such as configuring resilient retainer plates (not shown) to fit between corresponding faces of each segment 104a–104h, or springs could be used, without departing from the spirit and scope of the invention.

Referring to FIGS. 5–7, the second resilient member 123 is disposed within the longitudinal bore 112 to assist in radially expanding the segments 104a through 104h following compression of a shell 19 to form a modulator 40. The second resilient member 123 is retained within a chamber 115 bounded within the segmented cone 102 by the internal throat 114 at the top of the chamber 115 and by the forming section 116 at the bottom of the chamber 115. The second resilient member 123 is preferably made from an elastomeric material such as urethane rubber and is preferably formed in the shape of a solid cylinder. Those of ordinary skill in the art will recognize that the second resilient member 123 may be made in any shape that would permit placement within the longitudinal bore 112 and may be made from any resilient material. Alternative structures for separating the segments 104a through 104h following compression of the shell 19 are spheres or they could be egg shaped.

Figure 8:
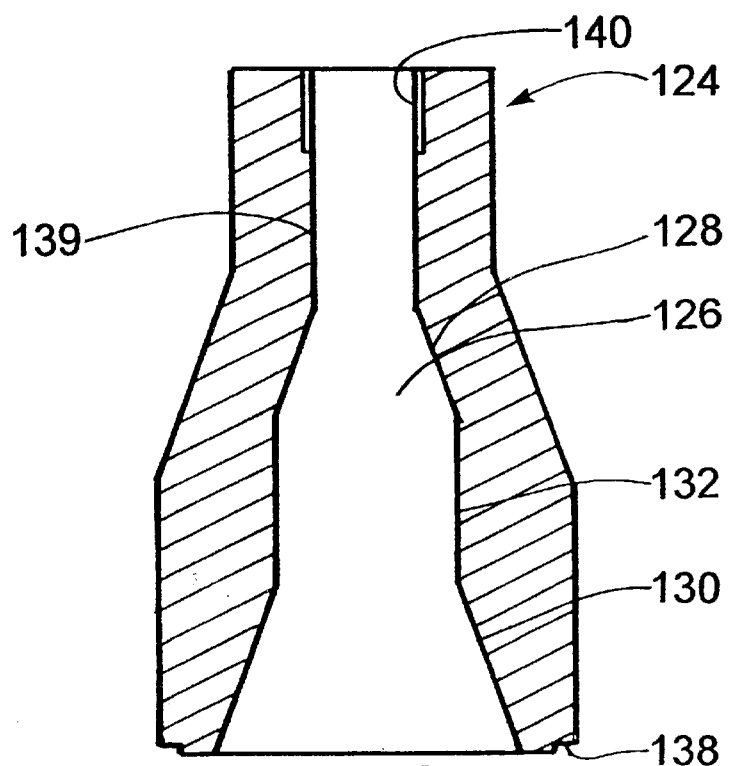
FIG. 8 is an elongated cross-sectional detail view of a receiver of the compression tool shown in FIG. 5.

Referring now to FIGS. 5 and 8, the compression tool 100 also includes a receiver 124 for receiving the segmented cone 102 during use of the compression tool 100. The receiver 124 is preferably made of a high-strength, light weight material, such as steel. Those of ordinary skill in the art will recognize upon reading this disclosure that the receiver 124 could be made from any material having sufficient hardness and tensile strength to force the segments 104a through 104h together as the receiver 124 is forced over the segments 104a through 104h. As best shown in FIG. 8, the receiver 124 has a first end 124a, an opposing second end 124b, and an internal passage 126 passing longitudinally through the receiver 124. The internal passage 126 includes a first conical portion 130 adjacent to the first end 124a, a first cylindrical portion 132 adjacent to the first conical portion 130, a second conical portion 128 adjacent to the first cylindrical portion 132, and a second cylindrical portion 139 adjacent to the second conical portion 128 and the second end 124b. At the outboard end of the second cylindrical region 139 is a set of internal threads 140 for attachment of the end plug 142, as discussed below. The internal threads 140 are preferably straight machine screw threads, however, threads of virtually any nature could be employed without departing from the spirit and scope of the invention. The receiver 124 also has a circumferential groove 138 at its end opposite from the threads 140. The function of the circumferential groove 138 is described below.

Figures 9, 10:
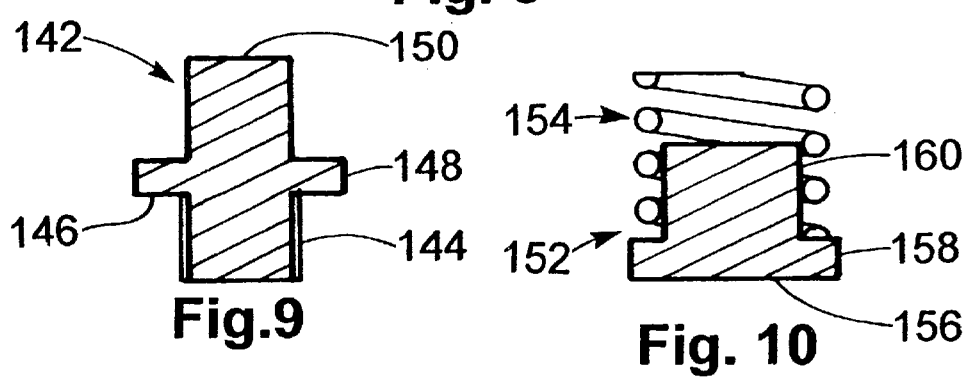
FIG. 9 is a cross-sectional view of an end plug of the compression tool shown in FIG. 5.
FIG. 10 is a cross-sectional detail view of a plunger and coil spring of the compression tool shown in FIG. 5.

Referring to FIGS. 5, 8, and 9, an end plug 142 is attached to the end of the receiver 124. The end plug 142 is preferably made of steel. The end plug 142 has external threads 144 which mate with internal threads 140 in the internal passage 126 of the receiver 124 and which are preferably straight machine screw threads. The end plug 142 could be fixed to the receiver 124 by alternative means such as by welding. The end plug 142 also includes a shoulder 146 which permits the end plug 142 to be securely tightened to the receiver 124 since straight machine threads rather than tapered threads are used. To assist in assembly, the outer surface 148 of the shoulder 146 preferably has a hexagonal shape for engagement with a wrench (not shown). Alternatively, the end plug 142 could have a recess (not shown) in the exposed, upper end 150 having an internal hexagonal shape to receive a hex key (not shown).

Referring to FIGS. 5 and 10, there is shown the plunger 152 and the first resilient member 154. Referring to FIG. 10, the plunger 152 has a contact surface 156 which contacts the second end 102b of the segmented cone 102. The plunger 152 includes a shoulder 158 around its lower circumference which is sized to slide freely within the second cylindrical portion 139 of the receiver 124. The plunger 152 also includes a hub 160 which extends upwardly from the shoulder 158. The first resilient member 154 is disposed over the hub 160 and is, at one end, in engagement with the shoulder 158. The end of the first resilient member 154 opposite the shoulder 158 is in contact with the end plug 142 to assist in disassembly as will be discussed below.

Figure 11:
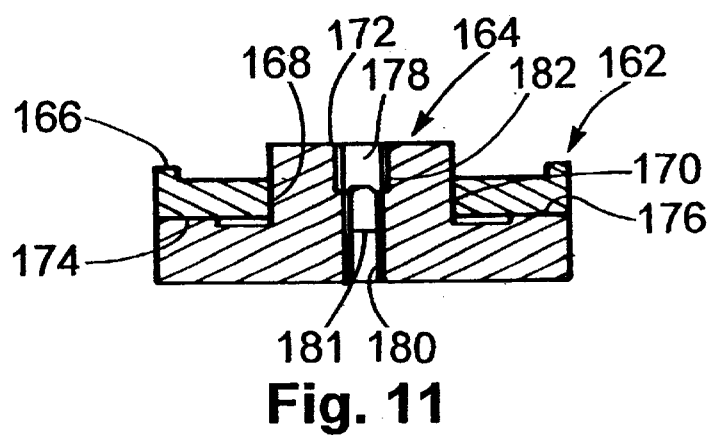
FIG. 11 is a cross-sectional detail view of a base plate and retainer plate of the compression tool shown in FIG. 5.

Referring to FIGS. 5 and 11, there is shown the retainer plate 162 and base plate 164. As best shown in FIG. 11, the retainer plate 162 has a first end 162a and an opposing second end 162b, and ridge 166 extending upwardly from the second end 162b which mates with the circumferential groove 138 on the end of the receiver 124 and which ridge 166 and groove 138 cooperate to maintain the retainer plate 162 centrally disposed with respect to the receiver 124. The retainer plate 162 is fixedly attached to the receiver 124, preferably by bolts or screws (not shown) passing through the retainer plate 162 and into the bottom end of the receiver 124. The base plate 164 has a first end 164a and an opposing second end 164b.

Alternatively, the retainer plate 162 can be attached to the receiver 124 through mating threads (not shown) on the radially outer surface of the circumferential groove 138 and the radially inner surface of the ridge 166. The retainer plate 162 includes a throughbore 168 having an inner diameter which is sized to slidably engage the outer cylindrical surface 170 of a central hub 172 extending upwardly from the base plate 164. Also extending upwardly from the second end 164*b* of the base plate 164 is a circumferential, annular hub 176 which, during operation, seats against the end surface 174 of the retainer plate 162 as described below. The base plate 164 is also provided with a mounting hole 178 therethrough having at its lower end internal threads 180 which are adapted for retaining a modulator 40. A set screw 181 is disposed within the portion of the mounting hole 178 nearer the first end of the base plate 164 and has external threads (not shown) which mate with internal threads 180. Disposed within the end of the mounting hole 178 nearer the second end of the base plate 164 are internal threads 182 that engage the external threads 30 of the flanged nipple 12 to secure the modulator 40 into the compression tool 100 during assembly. The retainer plate 162 and base plate 164 are made from high-strength, light-weight material which is dimensionally stable under repeated high compressive loading. The retainer plate 162 and base plate 164 are preferably made of steel. Those of ordinary skill in the art will recognize upon reading this disclosure that the retainer plate 162 and base plate 164 may be made from any number of different materials so long as the dimensional stability requirements described above are met.

In operation, the compression tool 100 is assembled and used as follows. Referring to FIGS. 5 through 11, a modulator 40 is joined to the base plate 164 by screwing the external threads 30 on the modulator 40 into the internal threads 182 of the base plate 164. The modulator 40 is screwed into the base plate 164 until the end of the flanged nipple 12 contacts the set screw 181, which is set at a predetermined depth within the mounting hole 178 to achieve consistency in the depth of engagement of the modulator 40. The shell 19, which is in its uncompressed state (not shown), is positioned on the flexible flow adjustment member 16 using a spacing fork (not shown) which is inserted beneath the shell 19 thereby creating a space of predetermined thickness between the shell 19 and the central hub 172. The thickness of the spacing fork is predetermined to work in conjunction with the positioning of the set screw 181 within the mounting hole 178 to locate the shell 19 symmetrically with respect to the end washer 14 and flange 22, in other words, to locate the shell 19 so that an equal amount of the shell 19 extends beyond the end washer 14 and the flange 22. The spacing fork remains in place until the shell 19 is properly positioned and then the spacing fork is removed. The shell 19 maintains its vertical position due to friction between it and the sealing surfaces 34, 36. It is understood by those of ordinary skill in the art that instead of the spacing fork, a spring-loaded floater (not shown) could be used to maintain the proper alignment of the shell 19.

To assemble the compression tool 100, the end plug 142 is threaded onto the upper end of the receiver 124, the first resilient member 154 is placed over the hub 160 of the plunger 152, and the first resilient member 154 and plunger 152 are inserted into the second cylindrical portion 139 of the receiver 124 such that the first resilient member 154 is in contact with the end plug 142. The segmented cone 102, in its assembled state having the second resilient member 123 and elastic members 125 installed therein, is placed within the receiver 124, and the retainer plate 162 is attached to the bottom end of the receiver 124. This entire assembly is then set down over the modulator 40 and base plate 164 such that the modulator 40 is received within the forming section 116 and the top surface of the central hub 172 contacts the bottom surface of the segmented cone 102.

A compressive force from an external source (not shown) is exerted against the end plug 124 or, alternatively, against an upper surface of the receiver 124 such that the receiver 124 moves downwardly with respect to the segmented cone 102. As the receiver 124 travels downwardly with respect to the segmented cone 102, the second conical portion 128 of the receiver 124 corresponds with the smaller frusto-conical portion 106 of the segmented cone 102, the first conical portion 130 of the receiver 124 corresponds with the first frusto-conical surface 108 of the segmented cone 102, and the first cylindrical portion 132 of the receiver 124 corresponds with the cylindrical portion 110 of the segmented cone 102. The correspondence of these features causes the segments 104*a* through 104*h* to draw radially inwardly as the receiver 124 travels downwardly with respect to the segmented cone 102, thereby compressing the shell 19 within the forming section 116. The downward movement of the receiver 124 also causes the second end 102*b* of the segmented cone 102 to force the plunger 152 upwardly causing compression of the resilient member 154. Downward movement of the receiver 124, by causing radially inward movement of the segments 104*a* through 104*h* and thus decreasing the diameter of the longitudinal bore 112, also causes the second resilient member 123 and elastic members 125 to become compressed. The useful function of this compression will become apparent below.

Force is applied until the circumferential hub 176 of the base plate 164 contacts the bottom surface of the retainer plate 162, whereupon compression of the shell 19 is complete. As best shown in FIGS. 5 and 11, the downward travel of the receiver 124, and, correspondingly, the degree of compression of the shell 19, can be easily adjusted by varying the thickness of the circumferential hub 176. Having completed the compression of the shell 19 to form a modulator 40, the compression tool 100 is retracted to remove the modulator 40. In this regard, the external source of compressive force is removed whereupon the compressed first resilient member 154, second resilient member 123, and elastic members 125 act to assist in retraction of the compression tool 100. The first resilient member 154 exerts force against the end plug 142 and against the second end 102*b* of the segmented cone 102 such that the receiver 124 is thrust upwardly with respect to the segmented cone 102, thereby permitting the second resilient member 123 and elastic members 125 to thrust the segments 104*a* through 104*h* radially outwardly such that the modulator 40 may be removed.

It will be appreciated by those skilled in the art that changes could be made to the embodiment described above without departing from the broad inventive concept thereof. It is understood, therefore, that this invention is not limited to the particular embodiment disclosed, but it is intended to cover modifications within the spirit and scope of the present invention as defined by the appended claims.

What is claimed is:

1. A valve for automatically modulating a flow of a stream of fluid, the valve comprising:
   a housing having a wall defining an interior cavity, the interior cavity being in fluid communication with the stream of fluid;
   a modulator mounted within the interior cavity, the modulator including:
   a shell having an outer face, the outer face being in fluid communication with the stream of fluid;

a flexible flow adjustment member within the shell, the flexible flow adjustment member having a variable diameter passage therethrough, the variable diameter passage being in fluid communication with the stream of fluid;

a void between the flexible flow adjustment member and the shell; and a thermally reactive material within the void, the thermally reactive material being in contact with the shell for thermal communication therebetween.

2. The valve of claim 1, wherein the housing further includes a radially inwardly extending throat, the modulator being mounted to the throat.

3. The valve of claim 2, further comprising:

an end washer having an orifice therethrough and an outer circumferential edge, the end washer positioned at a second end of the flexible flow adjustment member, the orifice being in fluid communication with the variable diameter passage, the outer circumferential edge of the washer being sealingly engaged to the flexible flow adjustment member; and a flanged nipple having a bore therethrough and a flange at a first end of the nipple, the flange being sealingly engaged with a first end of the flexible flow adjustment member, the bore being in fluid communication with the variable diameter passage, and a second end of the flanged nipple being connected to the throat.

4. The valve of claim 1, wherein the thermally reactive material is a hydrocarbon wax.

5. A method of making a valve for automatically modulating a flow of a stream of fluid, the method comprising the steps of:

positioning a flexible flow adjustment member within a shell the shell having an outer face;

positioning a thermally reactive material between the flexible flow adjustment member and the shell;

sealing the thermally reactive material between the flexible flow adjustment member and the shell; and mounting the shell within a housing such that the outer face of the shell and the housing are in fluid communication with the stream of fluid.

* * * * *